March 28, 1939. G. G. GALPIN ET AL 2,152,541
APPARATUS FOR TESTING THE STRENGTH OF MOLDED BOTTLE CAPS
Filed Oct. 30, 1937 3 Sheets-Sheet 1
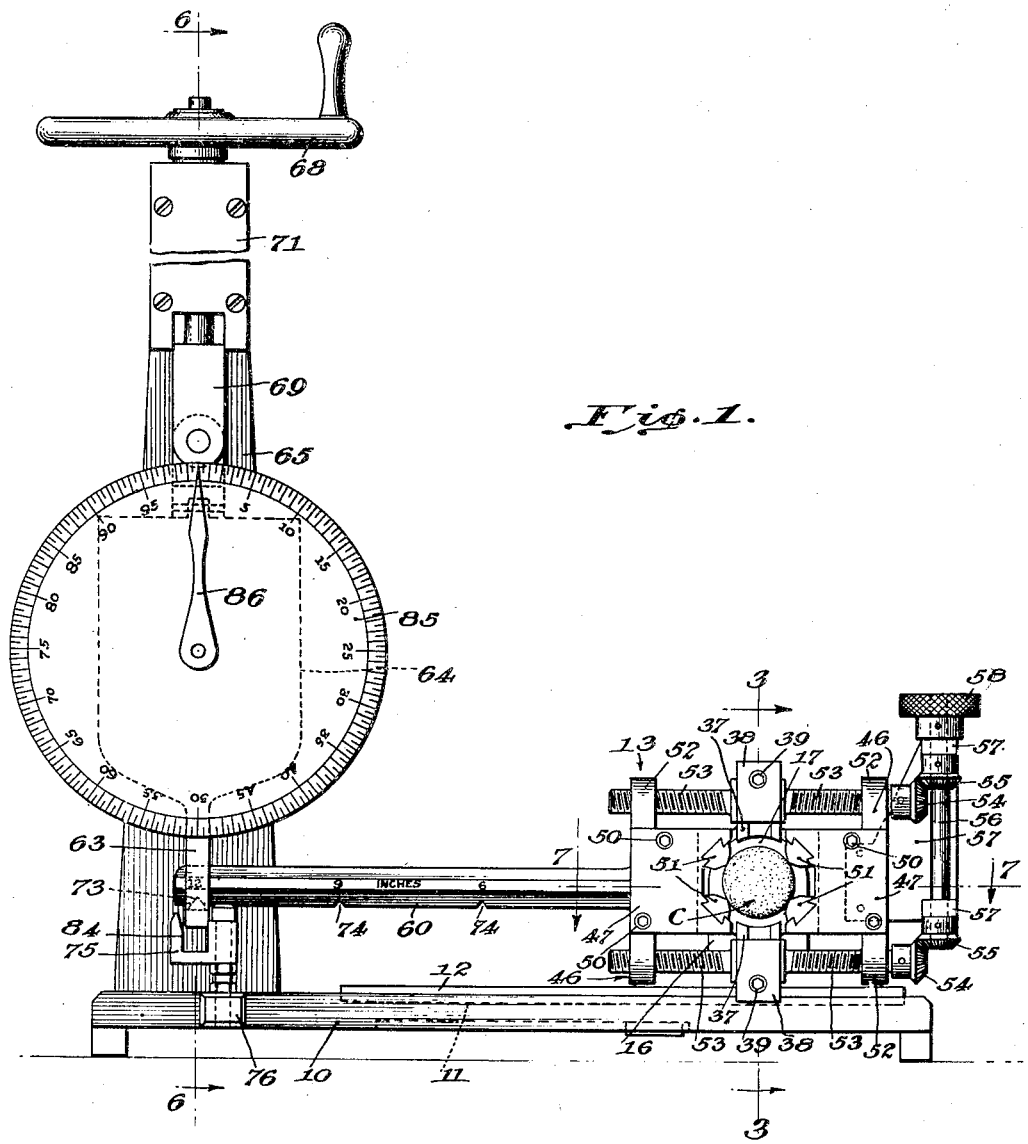
INVENTORS.
G. G. Galpin and
C. F. Schmidt
BY
Rule & Hoge
ATTORNEYS.

March 28, 1939.  G. G. GALPIN ET AL  2,152,541
APPARATUS FOR TESTING THE STRENGTH OF MOLDED BOTTLE CAPS
Filed Oct. 30, 1937    3 Sheets-Sheet 2
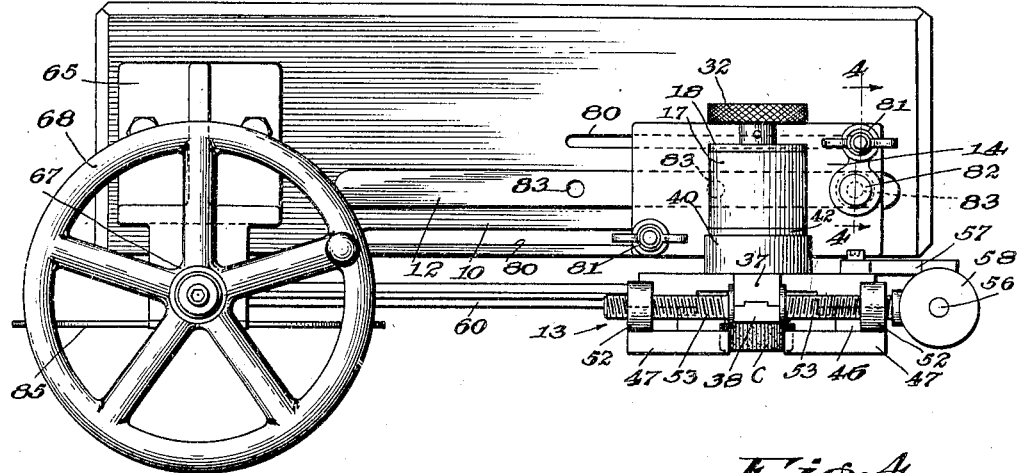
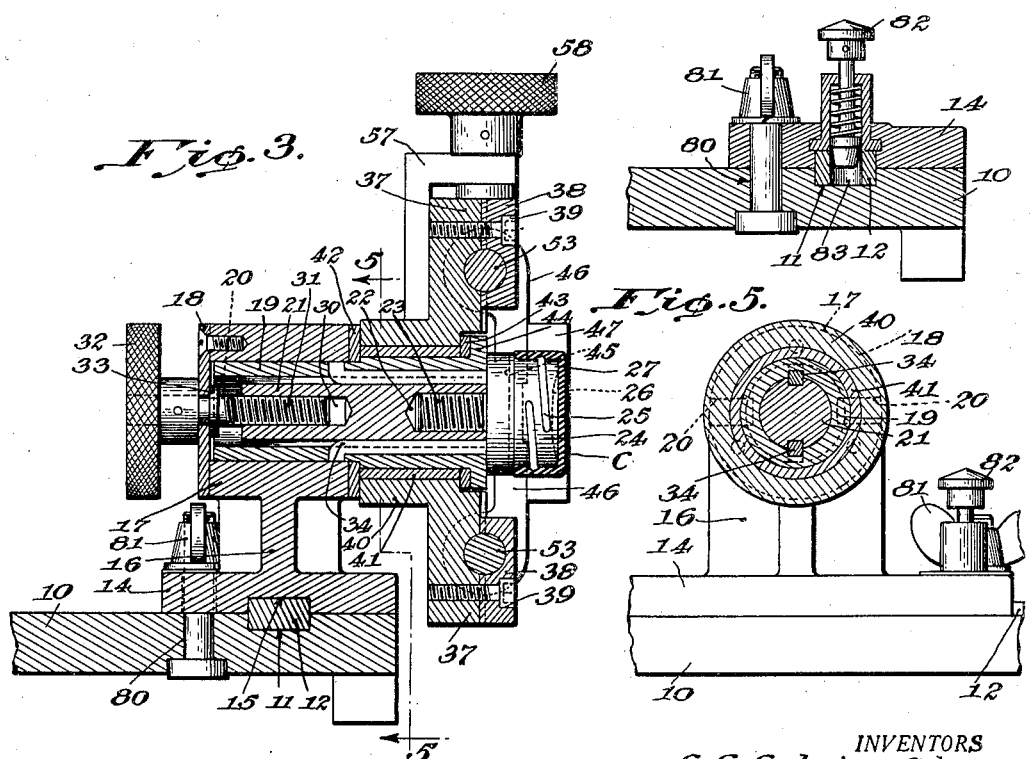
INVENTORS
G. G. Galpin and
C. F. Schmidt,
BY
Rule & Hoge
ATTORNEYS.

March 28, 1939.  G. G. GALPIN ET AL  2,152,541
APPARATUS FOR TESTING THE STRENGTH OF MOLDED BOTTLE CAPS
Filed Oct. 30, 1937   3 Sheets-Sheet 3
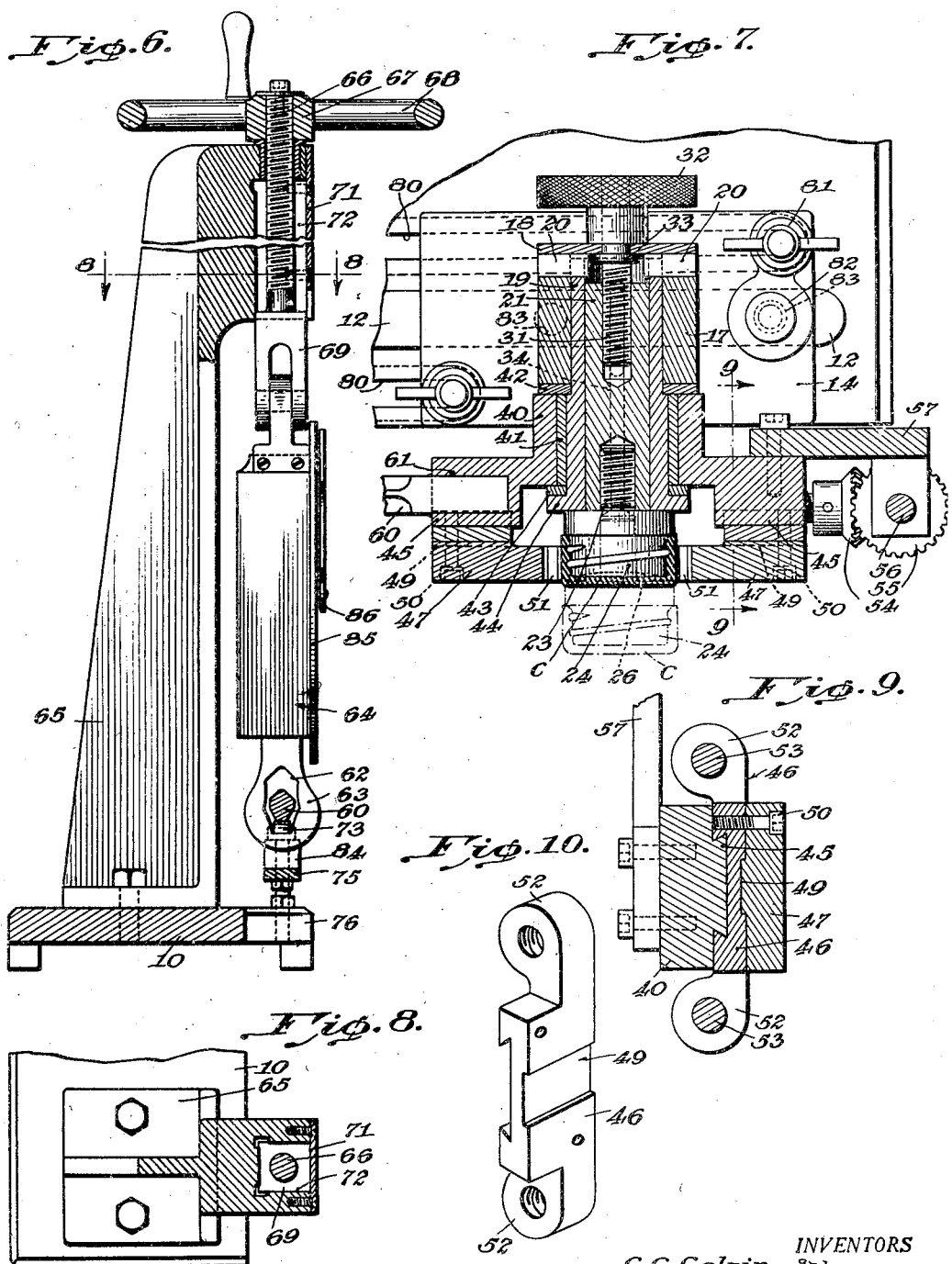
INVENTORS
G. G. Galpin
and
C. F. Schmidt
BY
Rule & Hoge
ATTORNEYS.

Patented Mar. 28, 1939

2,152,541

UNITED STATES PATENT OFFICE 2,152,541

APPARATUS FOR TESTING THE STRENGTH OF MOLDED BOTTLE CAPS

George G. Galpin and Charles F. Schmidt, Toledo, Ohio, assignors to Owens-Illinois Glass Company, a corporation of Ohio Application October 30, 1937, Serial No. 171,978

8 Claims. (Cl. 265—19)

The present invention relates to an apparatus for testing the strength of molded bottle caps. More particularly the invention relates to a precision instrument by means of which the resistance to shear of the cap threads and the resistance to wall fracture may be accurately determined under conditions simulating actual use of the cap on a bottle and calculated in foot-pounds or other unit of energy by means of a visible dynamometer scale.

The principal object of the invention is to provide such an instrument which is extremely accurate in its measurements, yet which is rugged and durable and which consequently is unlikely to get out of order. Another object of the invention is to provide an instrument for testing caps which will accommodate caps of different sizes and peripheral contours.

In carrying out the above mentioned objects, the invention contemplates the provision of a stationary threaded mandrel, the end of which is recessed to simulate conditions existing when the cap is applied to a bottle neck, and upon which the cap is tightly threaded with the threads thereof in full threaded engagement with the threads on the mandrel and with the end of the mandrel in engagement with the bottom of the recess in the cap. The cap is engaged by a torque applying chuck which is mounted for turning movement about the axis of the mandrel and which is operatively connected through a torque applying lever to a tension device by means of which tension is applied to the lever in increasing amounts tending to lift the lever and apply a torque to the cap on the mandrel until the resistance thereof is overcome and rupture of the same occurs. A dynamometer scale associated with the tensioning device registers in pounds or other unit of force the maximum tension applied to the lever necessary to induce rupture of the cap and, by multiplying the effective length of the lever, expressed in feet or other unit of length, by the number of pounds or other unit of force, the resistance of the cap to wall fracture or thread shear may readily be calculated in foot-pounds or other unit of energy.

One embodiment of the precision instrument is illustrated in the accompanying drawings, in which:

Fig. 1 is a front elevational view of the instrument;

Fig. 2 is a top plan view thereof;

Fig. 3 is a sectional view taken substantially along the line 3—3 of Fig. 1;

Fig. 4 is a sectional view taken substantially along the line 4—4 of Fig. 2;

Fig. 5 is a sectional view taken substantially along the line 5—5 of Fig. 3;

Fig. 6 is a sectional view, partly in elevation, taken substantially along the line 6—6 of Fig. 1;

Fig. 7 is a sectional view taken substantially along the line 7—7 of Fig. 1;

Fig. 8 is a sectional view taken substantially along the line 8—8 of Fig. 6;

Fig. 9 is a sectional view taken substantially along the line 9—9 of Fig. 7; and Fig. 10 is a perspective view of one of a pair of jaw carrying members employed in connection with the invention.

Referring now to Fig. 1, the apparatus involves in its general organization an elongated platform 10 or base plate having a longitudinally extending recess 11 (see also Fig. 3) formed in the upper surface thereof in which there is fitted an elongated guide bar 12. A mandrel and torque applying chuck assembly 13 is slidably mounted on the base plate 10 longitudinally of the guide bar 12 and is capable of being anchored in any one of a plurality of positions therealong. The mandrel and torque applying chuck assembly 13 includes a foot-plate 14 (Fig. 3) having a recess 15 formed therein fitting loosely over the guide bar 12 and provided with an upstanding web 16 on the upper end of which is formed a sleeve 17, the rear end of which is closed by means of a plate 18. A bushing 19 disposed within the sleeve 17 is keyed thereto as at 20 (Fig. 7) and projects forwardly from the sleeve. Slidably disposed within the sleeve 17 and movable from the extended position shown in dotted lines in Fig. 7 to the retracted full line position thereof, is a slide member 21, the forward end of which is provided with a socket 22 designed to interchangeably and threadedly receive therein the shank 23 of any one of a number of various sized cap-supporting mandrels 24.

The mandrel 24 is preferably formed of case hardened and polished steel and is designed to simulate the neck portion of a bottle to which a cap of the type being tested for strength is applied. Accordingly, the mandrel 24 has threads 25 formed thereon and the forward end of the mandrel is recessed as at 26 to provide an annular rim 27 corresponding to the sealing rim of a bottle neck. The caps C undergoing testing are screwed tightly onto the mandrel with the threads thereof in full threaded engagement with the threads 25 and with the rim 27 in engagement with the peripheral regions of the bottom of the recess provided in the cap.

The inner end of the slide member 21 is recessed as at 30 to threadedly receive therein the shank 31 of an adjusting screw 32 which extends through the plate 18 and which is journalled therein against axial shifting by means of a thrust collar 33 formed thereon. Turning movement of the adjusting screw 32 in one direction or the other serves to project or retract the slide member from or into the bushing 19 as the case may be and thus the mandrel 24 may be moved to an accessible position as shown in Fig. 7 either for the purpose of placing a cap on the mandrel or for substitution of mandrels. The slide member 21 is keyed as at 34 to the bushing 19 to prevent turning movement of the former when torque is applied to the cap for testing purposes in the manner subsequently to be set forth.

The torque applying instrumentalities whereby torque is applied to the cap C on the mandrel 24 to induce rupture of the former are best illustrated in Figs. 1, 2, 3 and 7. A chuck-supporting ring 40 is rockably supported on the bushing 19, an anti-friction bushing 41 being interposed between these two parts. Spacing collars 42 and 43 mounted on the bushing 19 on opposite sides of the ring 40 and bushing 19, the former bearing against the forward end of the sleeve 17 and the latter bearing against an outwardly turned flange 44 formed on the bushing 19, serve to prevent axial shifting of the ring 40 on the bushing 19. The ring 40 has formed on opposite sides of its central opening a pair of dove-tail keys 45 (Figs. 3 and 9). A pair of jaw-supporting carriages 46 or slides (see also Fig. 10), each of which is provided with a dove-tail groove fitting over one of the keys 45, are disposed on opposite sides of the central opening of the ring 40 and are movable toward and away from each other. Jaw members 47 connected to the carriages 46 by a tongue and groove connection 49 are anchored in position on the carriages 46 by means of cap screws 50. Each jaw member, of which there are two, carries a pair of jaw elements 51 which are spaced apart and which are designed for engagement with the periphery of the cap C at spaced points thereon.

In order that the carriages 46 may be moved toward and away from each other to close or open the jaws 51, the carriages 46 are provided with upper and lower enlargements 52 or ears through which threadedly extend upper and lower differential adjusting screw shafts 53 having right and left threads formed thereon. The shafts 53 are journaled centrally in respective split bearing blocks, the pillow portions 37 of which are integrally formed on the ring 40 and the cap portions 38 of which are secured to the pillow portions 37 by means of cap screws 39. The shafts 53 have mounted thereon at adjacent ends thereof bevel gears 54 which mesh with bevel gears 55 mounted on a vertical shaft 56 which is journaled in a bracket 57 (Fig. 7) secured to the ring 40. The extreme upper end of the shaft 56 has mounted thereon an adjusting screw wheel 58. The pitch and direction of the threads formed on the upper and lower screw shafts 53 being identical, turning of the adjusting wheel 58 in one direction or the other will cause rotation of the shafts 53 in unison to move the jaws 51 into or out of engagement with a cap C placed on the mandrel 24.

The ring 40, being rockably mounted on the anti-friction bushing 41, permits limited rocking movement of the torque applying instrumentalities when the jaws 51 are in engagement with the cap C. Such rocking movement serves to force the cap C tightly onto the mandrel 24 to induce rupture thereof when the inherent resistance of either the threads or of the cap skirt, or of both, has been overcome.

In order to rock the torque applying instrumentalities about the axis of the mandrel 24 and apply a torque to the cap C thereon, a lever 60 has its inner end received in a socket 61 (Fig. 7) and is welded therein. The lever 60 extends laterally from the mandrel and chuck assembly 13 and overlies the base plate 10 coextensively therewith. The lever extends through an opening 62 formed in the suspension tongue 63 of a conventional type of suspension scale 64 which is suspended from the upper end of a standard 65 by means of a lifting screw 66. The lifting screw 66 extends through the hub 67 of a hand-wheel 68 in which it is threadedly received. The lower end of the lifting screw is provided with a suspension bracket 69 by means of which the scale 64 is suspended, and a plate 71 (Figs. 1 and 6) secured to the standard 65 confines the bracket 69 in a channel 72 provided between the plate and bracket and prevents turning movement of the lifting screw. Thus it will be seen that turning of the hand-wheel 68 in one direction or the other serves to raise the lifting screw 66 or to lower the same as the case may be.

The suspension tongue 63 is provided with a knife edge 73 (Fig. 6) designed for register with any one of a plurality of notches 74 formed in the lower side of the lever 60, means being provided for permitting the entire mandrel and torque applying assembly 13 to be moved toward and away from the standard 65 to permit selected notches 74 to register with the knife edge 73.

The lower end of the suspension tongue is guided in a channel 84 provided in a guide block 75 (Fig. 1) adjustably secured to a lug 76 integrally formed on the base plate 10.

In order that the mandrel and torque applying chuck assembly 13 may be shifted laterally toward and away from the standard 65 to vary the leverage applied to the cap C on the mandrel 24, slots 80 (Fig. 2) are formed in the base plate 10 on opposite sides of the guide bar 12. Clamping bolt assemblies 81 extend through the foot plate 14 and slots 80. A spring pressed locating pin 82 (see also Fig. 4) carried by the foot plate 14 is selectively receivable in any one of a number of locating holes 83 formed in the guide bar 12.

The relative spacing between the notches 74 formed in the lever 60 and between the locating holes 83 in the guide bar 12 is the same in order that, in any one of the selected positions of the mandrel and torque applying chuck assembly, a corresponding notch 74 will cooperate with the knife edge 73. While any desired number of notches and locating holes may be employed, in the present instance it has been deemed sufficient to illustrate three notches and a corresponding number of holes, the distance between adjacent notches being three inches, and the innermost notch being located six inches from the center of the mandrel 24. The notches are accordingly indicated by the indicia 6, 9 and 12. The scale 64 is provided with a dial 85 (Fig. 1) and an indicator needle 86 and is of the maximum reading type. The dial 85 is calibrated in pounds for convenience in order that the resistance of the caps undergoing testing to rupture may readily be calculated in foot-pounds.

In the operation of the instrument, the adjusting screw 32 (Fig. 7) is turned until the mandrel 24 is extended to the dotted lines position thereof where it is conveniently accessible for placement of a cap C thereon. The cap is screwed tightly onto the mandrel so that the screw threads of the cap are in full threaded engagement with the threads 25 on the mandrel and the rim 27 is in contact with the peripheral regions of the bottom of the recess provided in the cap. The adjusting screw 32 is again turned to retract the slide member 21 into the sleeve 17 and withdraw the mandrel 24 to the full line position thereof. The adjusting wheel 58 (Fig. 1) is then manipulated to cause the carriages 46 or slides to move inwardly toward each other and cause the jaws 51 to engage the periphery of the cap C at spaced points therearound.

It is assumed, of course, that the position of the mandrel and torque applying chuck assembly 13 has been selected so that one of the notches 74 is in register with the knife edge 73, and, for convenience the outermost notch 74 which is precisely one foot from the axis of the mandrel 24 is shown as being in register with the knife edge. The hand wheel 68 is then slowly turned in such a manner as to raise the lifting screw 66 (Fig. 6). The scale 64 is thus elevated and tension is gradually applied to the outer end of the lever 60. As this tension is increased, the indicator needle 86 advances on the dial 85 while at the same time the amount of torque applied to the cap C on the mandrel 24 by the jaws 51 is progressively increased.

Because of the fact that the suspension tongue 63 of the scale 64 is under tension, due to the inherent spring construction of the scale 64, when rupture of the cap C occurs, the rupture is complete. In other words, when the resistance of the cap to thread shear or to wall fracture is overcome, the first initial crack or cleavage in the plastic material of the cap so weakens the cap that the potential energy possessed by the spring instrumentalities of the scale 64 is more than adequate to complete the rupture instantaneously. The indicator needle 86, being at this moment at its point of maximum reading in pound units, and the scale being of the maximum reading type, the indicator needle 86 remains at this reading which is an accurate indication of the number of pounds pressure exerted on the lever 60 at the point of contact with the knife edge 73. Thus, by multiplying the number of pounds registered by the distance of the knife edge 73 from the axis of the mandrel 24, which in the present instance is arbitrarily one foot, the numbers on the scale are a true indication of the energy expended in rupturing the cap in foot-pound units. It is obvious that if the knife edge 73 is in contact with the notch 74 labeled 9 (inches) the reading of the dial 85 should be reduced by one-fourth. Likewise, if the knife edge is in cooperation with the notch labeled 6 the reading of the dial 85 must be divided by two.

Modifications may be resorted to within the spirit and scope of the appended claims.

We claim:

1. In an apparatus for testing the strength of threaded molded bottle caps, a mandrel having threads thereon designed for full threaded engagement with the threads of a cap to be tested, a tiltable chuck, jaws on said chuck, means for moving said jaws into engagement with a cap placed on said mandrel to clamp the cap therebetween, a lever secured to the chuck, a suspension scale operatively secured to said lever, and means for applying a leverage progressively to said lever through said scale to tilt the chuck.

2. In an apparatus for testing the strength of threaded molded bottle caps, a horizontally disposed stationary mandrel having threads thereon designed for full threaded engagement with the threads of a cap to be tested, a tiltable chuck, jaws on said chuck, means for moving said jaws into engagement with a cap placed on said mandrel to clamp the cap therebetween, a lever secured to the chuck and extending horizontally therefrom, a suspension scale operatively secured to said lever, and a lifting jack mechanism for progressively elevating said scale to apply increasing degrees of leverage to said lever to tilt the chuck.

3. In an apparatus for testing the strength of threaded molded bottle caps, a mandrel having threads thereon designed for full threaded engagement with the threads of a cap to be tested, a tiltable chuck, jaws on the chuck, means for moving said jaws into engagement with a cap placed on said mandrel to clamp the cap therebetween, a lever secured to the chuck, a scale having a suspension element secured to said lever, and means for bodily moving said scale to apply progressive degrees of leverage to said lever through said suspension element.

4. In an apparatus for testing the strength of threaded molded bottle caps, a horizontally disposed stationary mandrel having threads thereon designed for full threaded engagement with the threads of a cap to be tested, a tiltable chuck, jaws on said chuck, means for moving said jaws into engagement with a cap placed on said mandrel to clamp the cap therebetween, a lever secured to the chuck and extending horizontally therefrom, a suspension scale having a suspension element in lifting engagement with said lever, and a screw-operated lifting jack mechanism for progressively elevating said scale to apply increasing degrees of leverage to said lever to tilt the chuck.

5. An apparatus for testing the thread shear and wall fracture resistance of threaded molded bottle caps comprising a base plate, a mandrel mounted on said base plate and movable laterally thereon, threads on said mandrel designed for full threaded engagement with the threads of a cap to be tested, means for selectively anchoring said mandrel in a plurality of positions on said base plate, a tiltable chuck having jaws spaced about the mandrel and movable toward and away from the same, means for moving said jaws, said chuck being bodily movable with the mandrel, a suspension scale mounted on the base plate, said scale having a suspension element depending therefrom, a lever secured to said chuck and extending laterally therefrom and extending slidably through said suspension element, and means for elevating said scale progressively to apply a leverage to said lever through said suspension element.

6. In an apparatus for testing the strength of threaded molded bottle caps, a mandrel having threads thereon designed for full threaded engagement with the threads of a cap to be tested, there being a recess in the end of said mandrel providing a rim designed for engagement with the peripheral regions of the bottom of the recess formed in the cap when said threads are in full threaded engagement, means for applying a torque to the cap to turn the same on the mandrel and rupture the cap, and means for visibly indicating the amount of torque applied to said cap when the rupture thereof occurs.

7. In an apparatus for testing the strength of threaded molded bottle caps, a mandrel having threads thereon designed for full threaded engagement with the threads of a cap to be tested, a tiltable chuck, jaws on the chuck, means for moving said jaws simultaneously toward and away from the mandrel, means for moving said mandrel axially, a lever secured to said chuck, a scale having a suspension element secured to the lever, and means for moving the scale to apply a leverage to said lever through said suspension element and tilt said chuck.

8. An apparatus for testing the resistance of molded bottle caps to thread shear and wall fracture comprising a mandrel having threads thereon designed for full threaded engagement with the threads of a cap to be tested, a torque applying chuck mounted for turning movement about the axis of the mandrel, means for causing said chuck to engage a cap on the mandrel, a lever connected to the chuck and extending laterally therefrom, a dynamometer scale having its suspension tongue connected to said lever, and means for elevating said scale to apply a leverage to said lever through said tongue.

GEORGE G. GALPIN.
CHARLES F. SCHMIDT.